United States Patent
Hollander et al.

(10) Patent No.: US 7,213,153 B2
(45) Date of Patent: *May 1, 2007

(54) APPLICATION PROGRAM INTERFACE INTERCEPTION SYSTEM AND METHOD

(75) Inventors: Yona Hollander, Tel Aviv (IL); Ophir Rachman, Tel Aviv (IL); Oded Horovitz, Hertzelia (IL)

(73) Assignee: McAfee, Inc., Santa Clara, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 10/874,433

(22) Filed: Jun. 22, 2004

(65) Prior Publication Data

US 2004/0237071 A1 Nov. 25, 2004

Related U.S. Application Data

(63) Continuation of application No. 09/561,395, filed on Apr. 28, 2000, now Pat. No. 6,823,460.

(30) Foreign Application Priority Data

Nov. 14, 1999 (IL) ...................................... 132916

(51) Int. Cl.
*G06F 9/44* (2006.01)
(52) U.S. Cl. ...................... 713/187; 713/188; 713/189; 726/22; 71/1; 71/100; 71/200; 71/220; 71/240; 71/260
(58) Field of Classification Search ................. 726/22; 713/187–189; 710/1, 100, 200, 220, 240, 710/260
See application file for complete search history.

(56) References Cited

U.S. PATENT DOCUMENTS

| | | | | |
|---|---|---|---|---|
| 5,899,987 A | * | 5/1999 | Yarom | 707/3 |
| 6,230,312 B1 | * | 5/2001 | Hunt | 717/108 |
| 6,718,414 B1 | * | 4/2004 | Doggett | 710/267 |
| 6,823,460 B1 | * | 11/2004 | Hollander et al. | 426/3 |

OTHER PUBLICATIONS

Hunt et al., Detours: Binary Interception of Win32 Functions, Proceedings of the 3rd USENIX Windows NT Symposium, Seattle, WA, Jul. 1999, downloaded from the Internet Sep. 12, 2006.*

* cited by examiner

*Primary Examiner*—Taghi T. Arani
(74) *Attorney, Agent, or Firm*—Zilka-Kotab, PC; Christopher J. Hamaty

(57) ABSTRACT

A method of intercepting application program interface, including dynamic installation of associated software, within the user portion of an operating system. An API interception control server in conjunction with a system call interception module loads into all active process spaces an API interception module. An initializer module within the API interception module hooks and patches all API modules in the active process address space. When called by the application programs, the API routines' flow of execution, by virtue of their patched code, is re-directed into a user-supplied code in a pre-entry routine of the API interception module. The API routine might be completely by-passed or its input parameters might be filtered and changed by the user code. During the operation, the API routine is double-patched by the API interception module to ensure that all simultaneous calls to the API routine will re-direct its flow of control into the API interception module. A user-supplied code in a post-entry module of the API interception module might filter or change the return values of the API.

18 Claims, 13 Drawing Sheets

APPLICATION PROGRAM INTERFACE INTERCEPTION SYSTEM AND METHOD

This is a Continuation application of prior application Ser. No. 09/561,395 filed on Apr. 28, 2000, now U.S. Pat. No. 6,823,460 the disclosure of which is incorporated herein by reference.

BACKGROUND OF THE INVENTION

The present invention relates to a method and system for intercepting an application program interface within a computer system, in general and to a method and system of diverting control from an application program interface to user supplied functions within a computer system, in particular. The present invention further includes dynamic installation of associated software, within the user portion of an operating system and within the kernel portion of the operating system for the implementation thereof.

The present invention provides a method of implementing better security within a computer system and enhances security capabilities for systems such as Windows and NT. The present invention further provides a method of better control over function call routines also known as application program interface routines (API) in a manner transparent to the user.

Numerous security systems have previously been proposed and implemented in various systems such as UNIX and the like. None of the previous solutions provide an efficient, time saving and cost effective manner for controlling APIs. On the contrary, previous systems, relating to security in general, have resulted in high costs to users to implement, maintain and upgrade said systems.

Previously known systems, such as the Windows and NT operating systems, fail to secure computer systems making use of APIs from misuse of APIs. There is thus a need for a method for intercepting an application program interface within a computer system.

Therefore it is the object of the present invention to provide a method and system whereby API functions called by user applications are not allowed to execute unless the calling process has the requisite authority and privilege.

One application of such a system could be a security application whereby certain API functions called by user applications are not allowed to execute unless the calling process has the requisite authority and privilege.

Another application might include a system profiler whereby any or all API function calls issued by an application are tracked and used to generate statistics about the behavior of the user application.

Yet another application might include intensive parameter checking in conjunction with parameter filtering or parameter correction, whereby any or all API function input parameters sent by the calling application program and the return values from the API routine itself are handled according to prescribed rules.

Constructive in the abstraction of providing API function interception in a computerized environment is that the user-supplied code can be inserted and installed within the operating system where it can be accessed.

SUMMARY OF THE INVENTION

API routines are a primary target of intruders and executing API routines is a major objective of intruders in the acts of illegal access attempts from outside the operating system platform.

In Operating Systems (O/S) having many APIs as the interface between the program applications and the O/S, intruders are required to execute API functions if they want to gain access to higher privileges or obtain O/S services. Thus, intruders are able to obtain critical resources of the computing environment.

It is therefore the object of the present invention to provide a method and system whereby API functions called by user applications are not allowed to execute unless the calling process has the requisite authority and privilege.

It is also the object of the present invention to provide a method and system whereby parameters associated with the API functions to be examined and processed according to the authority and privilege of the calling process.

It is also the object of the present invention to provide a method and system whereby resulting values associated with the API functions to be examined and processed according to the authority and privilege of the calling process.

It is an object of the present invention to initialize API controlling routine and to hook at least one API routine in memory space associated with user application.

It is also the object of the present invention to replace the hooked API routine code with user supplied code, the user supplied code to be executed upon calling the API by the user application program.

It is also the object of the present invention to receive a call from a previously hooked API and generating a predefined series of operations to control said API operation.

It is also an object of the present invention to manage operation of API controlling routine, to collect and store information corresponding to the API routine.

It is also the object of the present invention to identify the API routine, to obtain the API routine address and to determine the address of at least one user supplied module associated with re-direction of flow of execution of the API routine.

It is further the object of the present invention to enable enhanced privileges relating to memory space associated with the API routine, to store API routine code associated with first re-direction of flow of execution to be later replaced, to store API routine code address associated with second re-direction of flow of execution, to store API routine code associated with second re-direction of flow of execution and replacing the API routine code stored with user supplied code associated with first re-direction of flow of the API routine.

It is also the object of the present invention to restore API routine code previously stored associated with first re-direction of flow of execution to be later replaced, to replace API routine code with user supplied code associated with second re-direction of flow of execution of the API routine and to call the API routine based upon response generated corresponding whether API routine is to be executed in association with user predefined rules.

It is further the object of the present invention to replace the API routine code stored with user supplied code associated with first re-direction of flow of execution of the API routine and to restore previously stored API routine code associated with second re-direction of flow of execution.

It is also the object of the present invention to limit execution of the user application to the specific API routine corresponding to execution time of API routine based on response generated corresponding to whether API routine is to be executed in association with user predefined rules.

It is also the object of the present invention to cancel the limit on execution of the user application to the specific API routine corresponding to execution time of API routine.

It is a further object of the present invention to execute user supplied code for determining return values of the API routine and to manipulate process level flow control structure to enable return of control to user application.

There is also provided in the present invention a method of inserting user supplied code into memory space of user application by injecting loader code into active process memory space associated with the user application and executing loader code to further load user supplied code into memory space, the user supplied code operative to further control API execution.

Also provided in the present invention are an apparatus controlling the method of providing user control of the API, which includes an initializer for obtaining list of active processes within the computer system, an injector for injecting API interception module into said active processes, means for monitoring predetermined system calls operative to further injection of API interception routine into new created process and means for updating the list of active processes.

There is also provided in the present invention an apparatus to provide system call interception, which includes means to obtain a list of active processes within the computer system, means to open processes within a computer system and means to issue notification massages associated with the system calls.

BRIEF DESCRIPTION OF THE DRAWINGS

The accompanying drawings, which are incorporated in and constitute a part of the specification, illustrate preferred embodiments of the invention and, together with the description, serve to explain the invention.

DETAILED DESCRIPTION OF THE PREFERRED EMBODIMENTS

An API is a set of routines that an application program calls to request and carry out services performed by the operating system. An API serves as an interface between the application program and the operating system. API functions' handle important and sensitive areas of the computerized environment such as communications, debugging, file handling, memory management, networks, printing, processes control and threads, security, services and the like. API functions' object code is generally implemented through the use of dynamic-link libraries (DLL). DLLs are commonly organized in modules ready to be loaded into the computer's memory device. When a process is created within a computer system, the DLL modules consisting of the API functions are loaded into the process address space.

API functions are powerful and most of them operate on the critical levels of the computerized environment. Because API functions serve as an interface between the Application Program and the Operating System, they commonly run having enhanced privileges.

Consequently, API routines are a crucial element in the course of illegal access attempts from outside the operating system platform.

In O/S having many APIs as the interface between the program applications and the O/S, intruders are required to execute API functions if they want to gain access to higher privileges or obtain O/S services. Thus, intruders are able to obtain critical resources of the computing environment.

O/S do not include a built in mechanism to intercept and examine API functions called from a user application. Once a user run application program calls an API function, there is no possibility of pre-processing said application program arguments, controlling said application program execution flow, monitoring said application program activities, or blocking said application program activation, if and when necessary.

As some API routines operate, while having the highest privileges within the computer operating system, it is desirable in many instances, to intercept API function calls and re-direct them to execute user-supplied custom code instead. Such instances may include general system management functions generally, and system security management functions particularly.

The API Interception System 10 environment and the operational logic of the present invention provides a method of intercepting an API and of diverting control from the API to user-defined custom code. The present invention provides novel methods, which enhance and add to capabilities of a user to gain access to system events. The user's capabilities to control, to manage, and to handle system events are also extended thereby.

The present invention will be described with reference to the accompanying drawings.

Figure 1:
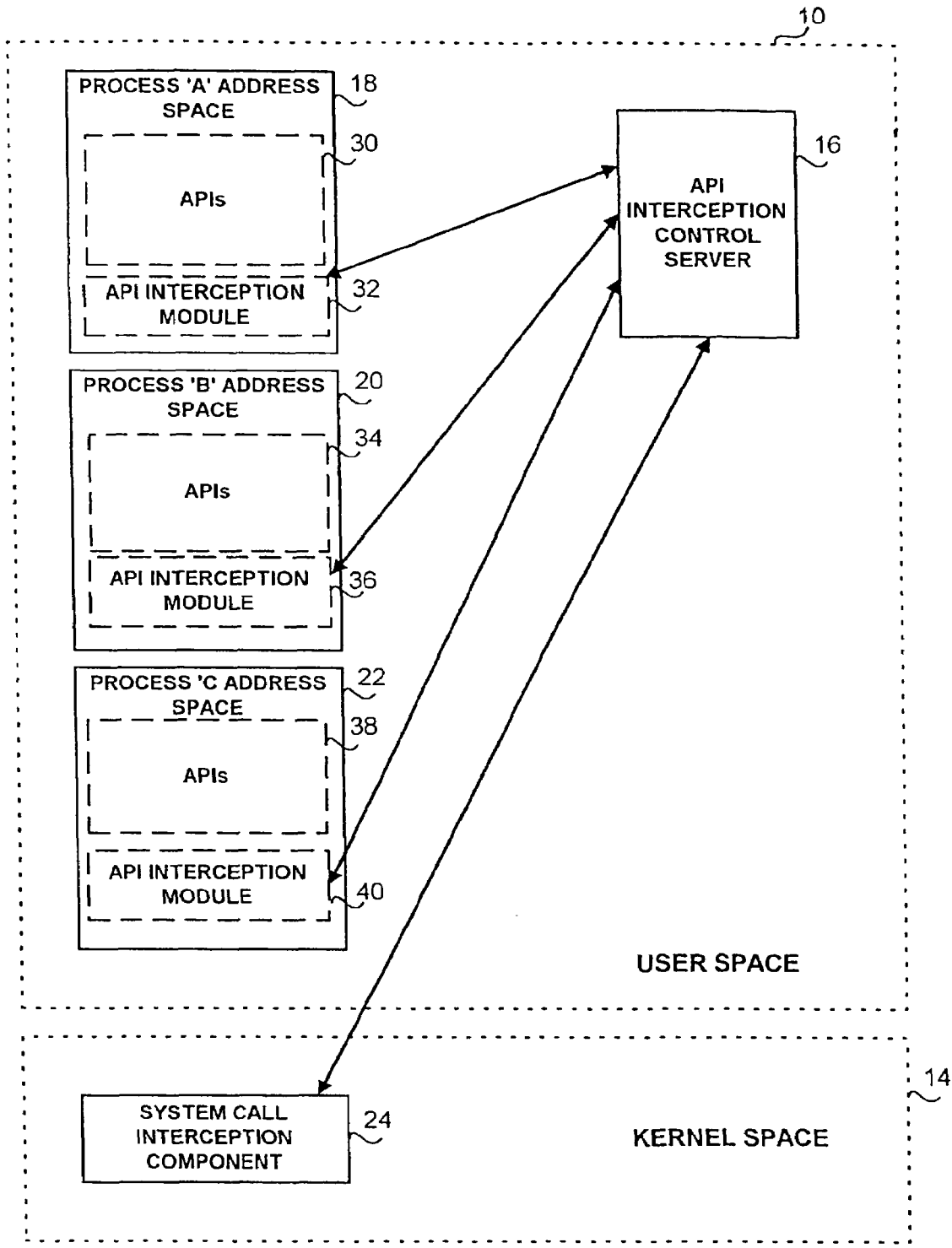
FIG. 1 is a schematic block diagram of an API Interception System environment generally referenced 10.

Turning now to FIG. 1 there is provided a schematic illustration of the system environment wherein the API Interception System is operating, generally referred to as system 10, in accordance with a preferred embodiment of the present invention.

System 10 comprises four major components of the API Interception System, three of which are active and one passive;

a) API Interception Control Server 16 is an active component. API Interception Control Server 16 is the operational center of the API Interception System 10. The API Interception Control Server 16 is loaded into the user space memory device 12 of a computer system implementing the present invention.

b) API Interception Module 32, 36, and 40 is an active component. API Interception Module 32, 36, and 40 is a DLL module, which is loaded by the API Interception Control Server 16 into each active process address space 18, 20, 22 loaded in user space memory device 12. DLLs are a set of callable subroutines linked as a binary image that can be dynamically loaded by computer programs that use them. A binary image is a collection of compiled modules that are combined by a linker into a form that is ready to be loaded for execution. API Interception Module 32 and all its copies 36, 40 inside active process address space 18, 20, 22 are linked with API Interception Control Server 16. The link is established directly by API Interception Module 32, 36, and 40, after API Interception Module 32, 36, 40 have been loaded into active process address space 18, 20, 22. It will be appreciated by those skilled in the art that the number of API Interception Modules copies present within active processes residing within the computer system user address space is associated with the number of process active at any given time. It is, however, one of the objects of the present invention to provide a further user predetermined control on the number of API Interception Modules to be associated with active process. Means for controlling the number of API Interception Modules to be associated with active process is preferably achieved using interactive command console present within API Interception Server 16. Allowing said control would greatly enhance the efficiency and speed of performing the methods contemplated by the present invention. It is further clarified that the number of API Interception Modules 30, 34, 38 and associated active processes 18, 20, 22 as shown in the drawings serve for purpose of illustration and it will be appreciated by those skilled in the art that many more active process may be associated with corresponding API Interception Modules.

c) System Call Interception Component 24 is an active component. System Call Interception Component 24 operates in the kernel space memory device 14 and is linked to API Interception Control Server 16, present within user space memory device 12;

d) API routine 30, 34, 38 is a passive component. API routines 30, 34, 38 are potential objects upon which API Interception System 10 operate. API routines 30, 34, 38 are loaded into each corresponding and associated process address space 18, 20, 22, which are loaded into user space memory device 12.

Figure 2:
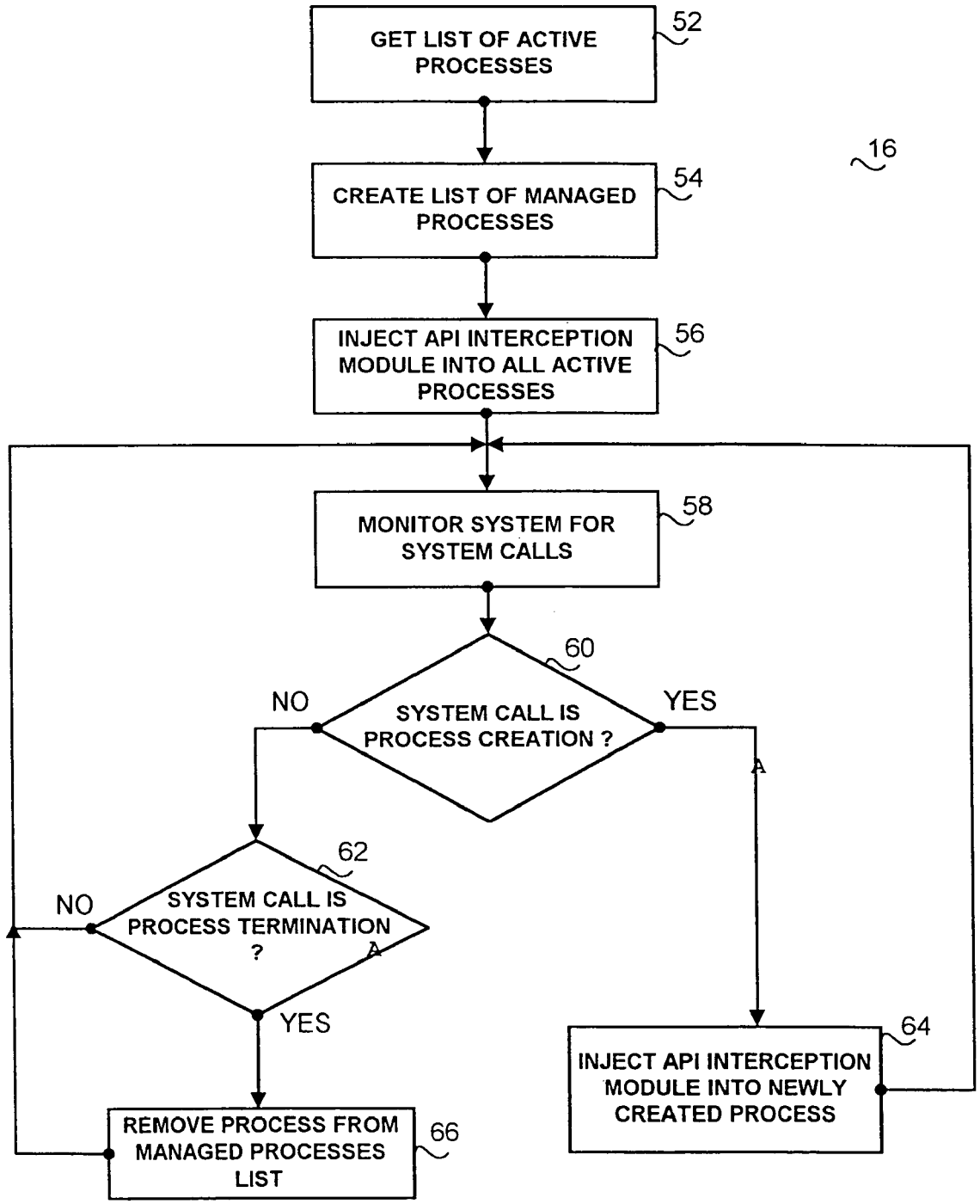
FIG. 2 is a high-level flow diagram of the API Interception Control Server operation referenced in FIG. 1.

Turning now to FIG. 2 there is provided a high-level flow diagram of the API Interception Control Server 16 operation.

The API Interception Control Server 16 is the command center of the API Interception System 10. The API Interception Control Server 16 in the framework of its tasks, initializes the system, loads and injects the appropriate DLL into the appropriate address spaces, supervises activities, monitors execution and concentrates messages of the API Interception System 10. The API Interception Control Server 16 monitors the host operating system for the creation and termination of processes, through the System Call Interception Module 24 and in turn will suspend, resume, and terminate processes and threads by issuing commands to the System Call Interception Module 24.

API Interception Control Server 16 begins its operation by loading System Call Interception Component 24 into kernel space memory device 14. After establishing communication with the System Call Interception Component 24, API Interception Control Server 16 requests from System Call Interception Component 24 the list of active processes (step 52). The list of active processes enables API Interception Control Server 16 to build a list of Managed Processes (step 54). Using the list of Managed Processes API Interception Control Server 16 injects API Interception Module 32, 36, 40 into the address spaces of all active processes 18, 20, 22 which are in user space memory device 12 (step 56).

During its run-time operation API Interception Control Server 16 constantly monitors the host operating system for system calls through System Call Interception Component 24 (step 58) and takes appropriate action according to the type of system calls detected. If the system call detected is process creation (step 60) then API interception Control Server 16 injects into the newly created process address space 18, 20, 22 a copy of the APT Interception Module 32, 36, 40 (step 64) and returns monitoring system calls (step 58). If the detected system call of the type process termination (step 62) API interception Control Server 16 removes the process 18, 20, 22 from the list of Managed Processes (step 66), further action might be optionally taken as required according to the type of the operating system.

Optionally, API Interception Control Server 16 may accept reports from API Interception Module 32, 36, 40 for the purpose of creating various Management Information Structures. Such structures could be used as input to Management Reports such as API function profiles or as frequency of use and length of use, user profiles such as types of API routines 30, 34, 38 used and other statistics. Naturally, such reports would be highly useful and valuable to users in charge of managing and controlling the over-all operation of a computer system and of an operating system platform such as system administrators.

Optionally, API Interception Server 16 might instruct System Call Interception Component 24 to call and run miscellaneous operating system services that can be executed in kernel space memory device 14 only. For example, API Interception Server 16 might request System Call Interception Component 24 to open a new process, to suspend, to resume, or to terminate an active process and the like.

Figure 3:
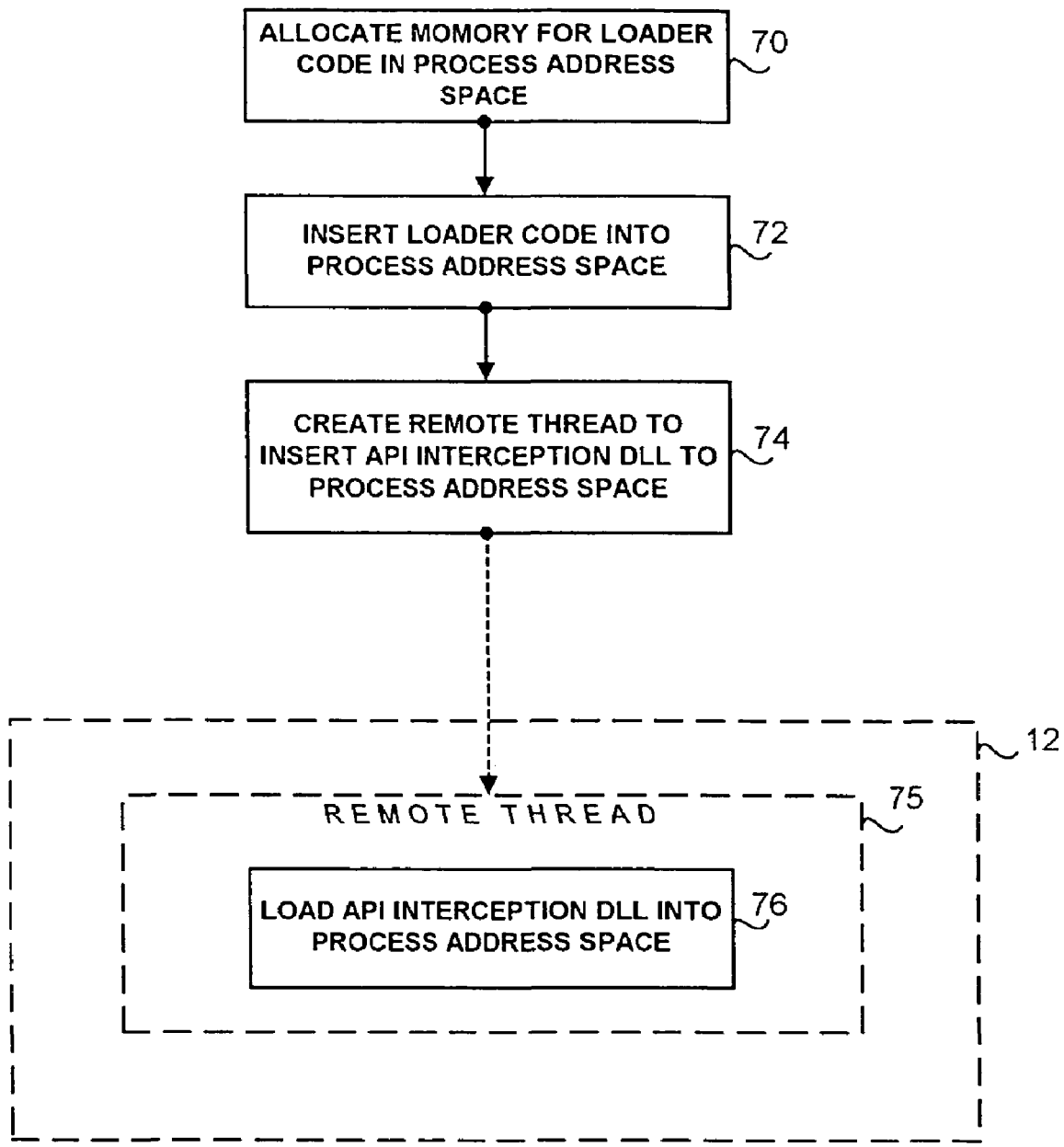
FIG. 3 is a flow diagram of the API Interception Module injection process referenced in FIG. 2.

A high-level flow diagram of the method of injecting API Interception Module 30, 34, 38 into address space of an active process 18, 20, 22 is illustrated in FIG. 3. API Interception Control Server 16 allocates memory for a Loader Code in the address space of the process 18, 20, 22 (step 70). Consequently, the Loader Code is inserted into the process address space 18, 20, 22 (step 72). The Loader Code is a small executable binary image that runs as a thread of the process 18, 20, 22. A thread is an entity within a process 18, 20, 22 that the host operating system schedules for execution. The Loader Code is activated and in turn calls an operating system pre-existing function that loads API Interception Module 32, 36, 40 into a predefined area in the process address space memory device 18, 20, 22 (step 74). For example, Call Remote Thread function, which can be used in conjunction with the NT operating system manufactured by the Microsoft Corporation, Redwood, Wash. USA, is such an operating system function that may be used to load the API Interception Module into a user predefined process address space memory device.

A remote thread is a thread that is created by a process with a specific instruction to run in the context of a different process. It will be appreciated that through the use of the method of injecting API Interception Module into address space of a memory device, a remote thread 75 is created. Consequently, API Interception Module 32, 36, 40 and the like are injected into the process address space 18, 20, 22 and the like (step 76).

It will be appreciated by those skilled in the art that there are other means that could be utilized for loading API Interception modules into a user process address space memory device such as using Asynchronous Procedure Calls (APCs) and the like. Utilizing APCs enables user programs and/or system routines to execute code in the context of a particular user thread.

Figure 4:
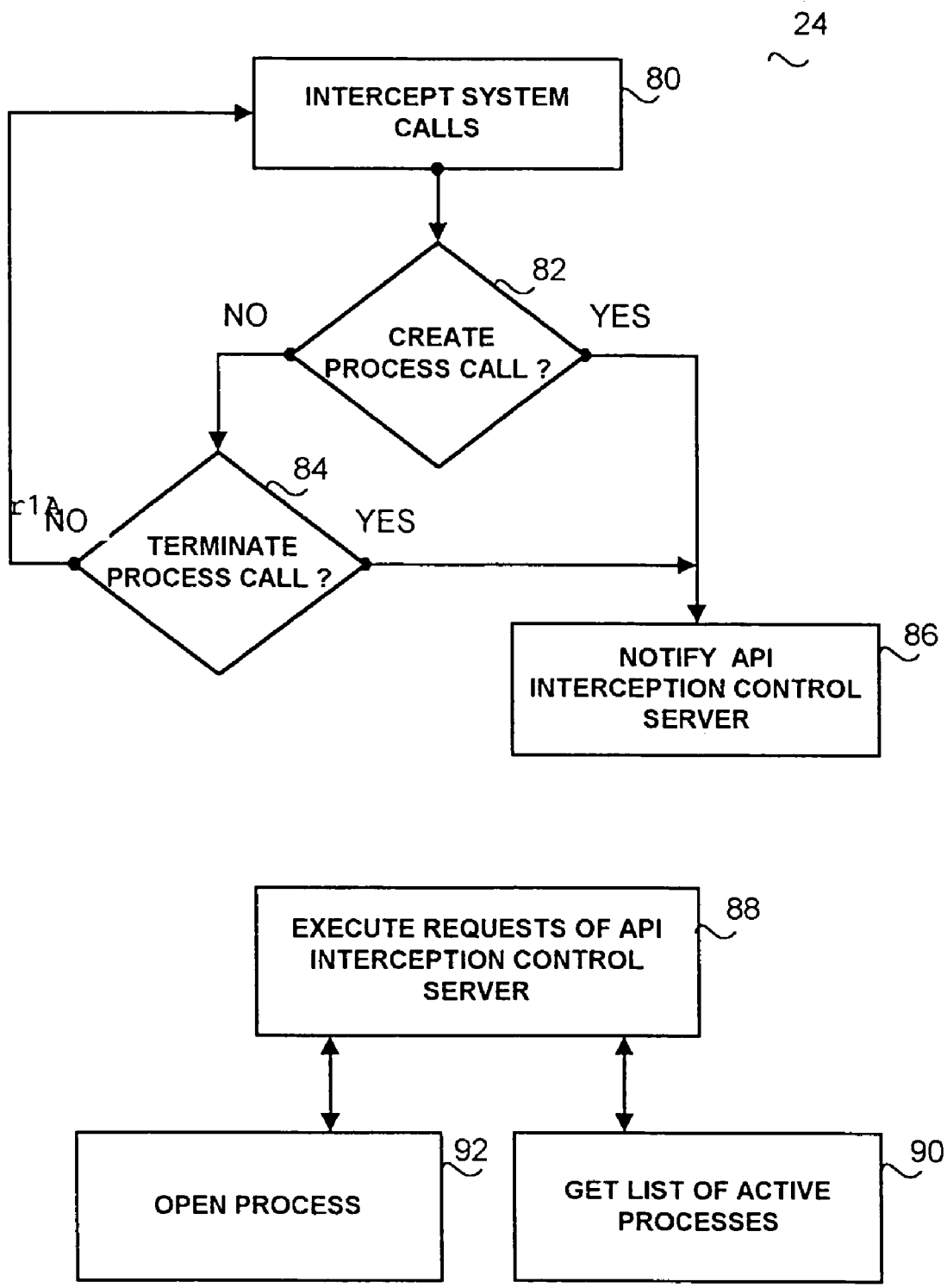
FIG. 4 is a flow diagram of the System Call Interceptor Component operation referenced in FIG. 1.

A high-level flow diagram of operation of the System Call Interceptor Component 24 is illustrated in FIG. 4. System calls are requests made by user programs or by other system routines to run operating system routines, functions or services in kernel mode. Kernel mode refers to a mode of execution in a processor that grants access to system memory devices and all CPU (Central Processing Unit) instructions. System Call Interception Component 24 that operates in kernel space memory device 14 intercepts all operating system calls (step 80). System Call Interception Component 24 will notify API Interception Control Server 16 of system calls relevant to process and thread creation or termination. First System Call Interception Component 24 determines the type of system call (step 82, step 84) and subsequently sends this information to API Interception Control Sever 12 (step 86). In the present description there is described the operating of the System Call Interception Component 24 in relation to system call instructing the O/S to create a process or to terminate a process. It will be appreciated that many other various system call may be identified and processed by the method and system operative in accordance with the present invention.

System Call Interception Component 24 also executes requests made to it by API Interception Control Server 16 (step 88). To get a list of active processes 18 which API Interception Control Server 16 needs for the operation of the API Interception System 10, a request for the list of active processes is made to System Call Interception Component 24 (step 90). The result is this request will be passed back to API Interception Control Server 16 in the form of the requested list.

Another request that could be made to System Call Interception Component 24 by API Interception Control Server 16 is Open process request (step 92). The execution of this request will open a process and the result will be passed back to the API Interception Control Server 16.

Optionally, API Interception Control Server 16 might make other requests to System Call Interceptor Component 24 such as terminating a thread or a process according to the type of the operating system the API Interception System 10 is running under.

Figure 5:
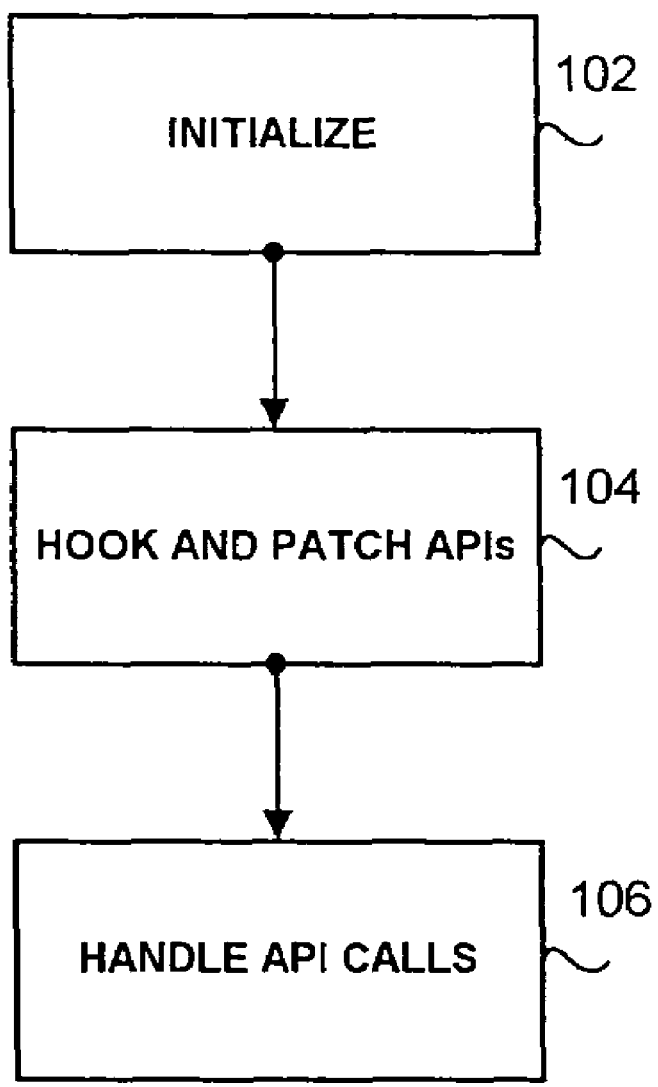
FIG. 5 is a high-level flow diagram of the API Interception Module operation referenced in FIG. 1.

The high-level flow diagram of the API Interception Module 32 operation is illustrated in FIG. 5.

API Interception Module 32 begins its operation immediately after being loaded into process 18 address space by initializing API Interception System 10 (step 10). Consequently API Interception Module 32 hooks and patches APIs 30 active and loaded into the process 18 address space (step 104). During its run-time operation API Interception Module 32 handles API calls that are being made by the application programs in the host operating system (step 106). The manner of operation of the API Interception Module 32 is further explained and illustrated in the following description and drawings.

Figure 6:
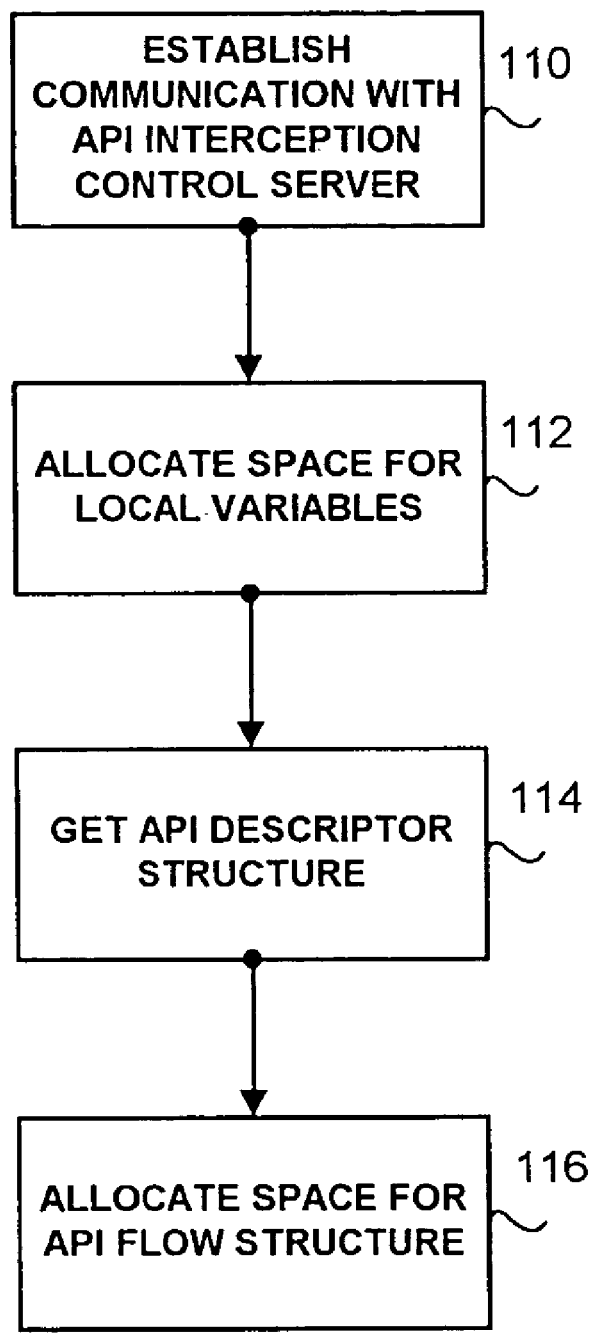
FIG. 6 is a flow diagram of the API Interception Module Initialization routine operation referenced in FIG. 5.

Referring to FIG. 6 there is provided a flow diagram of the API Interception Module 32 initialization operation of FIG. 5.

After API Interception Module 32 is loaded, the API Interception Module 32 establishes connection with API Interception Control Server 16 for future communications and events delivery (step 110). Once communication was established various local variables are allocated within address space (step 112). API Interception Module 32 accesses the pre-defined API Descriptor Structure (step 114) and allocates address space for API Flow Structure (step 116). API Descriptor Structure is a user predefined table consisting and referring to APIs to be handled by the API Interception Control Server 16. API Descriptor Structure may consist of the DLL name owning said API, API name, number of parameters passed to API, user function names to be used before API is executed and thereafter. It will be appreciated that such a table may include various other details and information as is consistent with the operation of the present invention. It will be further appreciated that such a table is initially provided as part of the of the API Interception Control Server 16. API Interception Structure is a table created dynamically by API Interception Module 32 as is further detailed in FIG. 7 and the accompanying description. API Interception Structure table is used to maintain information pertinent to the operation of the method and system operative in accordance with the present invention. API Interception Structure Table may include information such as address of the hooked API function and protection flag for the memory device page allowing control over memory device changes and updates. API Interception Structure Table may further include address of user function to be executed before the hooked API (Pre-Entry routine), address of user function to be executed after the hooked API is executed (Post-Entry routine) and the hooked API number of parameters to be passed to said API.

It will be appreciated that various means for creating and storing such a table may be employed. It will be further appreciated that such table may be stored and maintained in various locations within said computer system, including within the user address space of active process in which API Interception Module is operating and the like.

Hooking, as a concept used in the context of this document, is defined as obtaining control of a desired API function 30.

Patching, as a concept used in the context of this document, is defined as intentional overwriting of a section or sections of an executable binary file such as an API function 30 as it appears in the process address space 18 for the purpose of deliberately controlling the code behavior.

Figure 7:
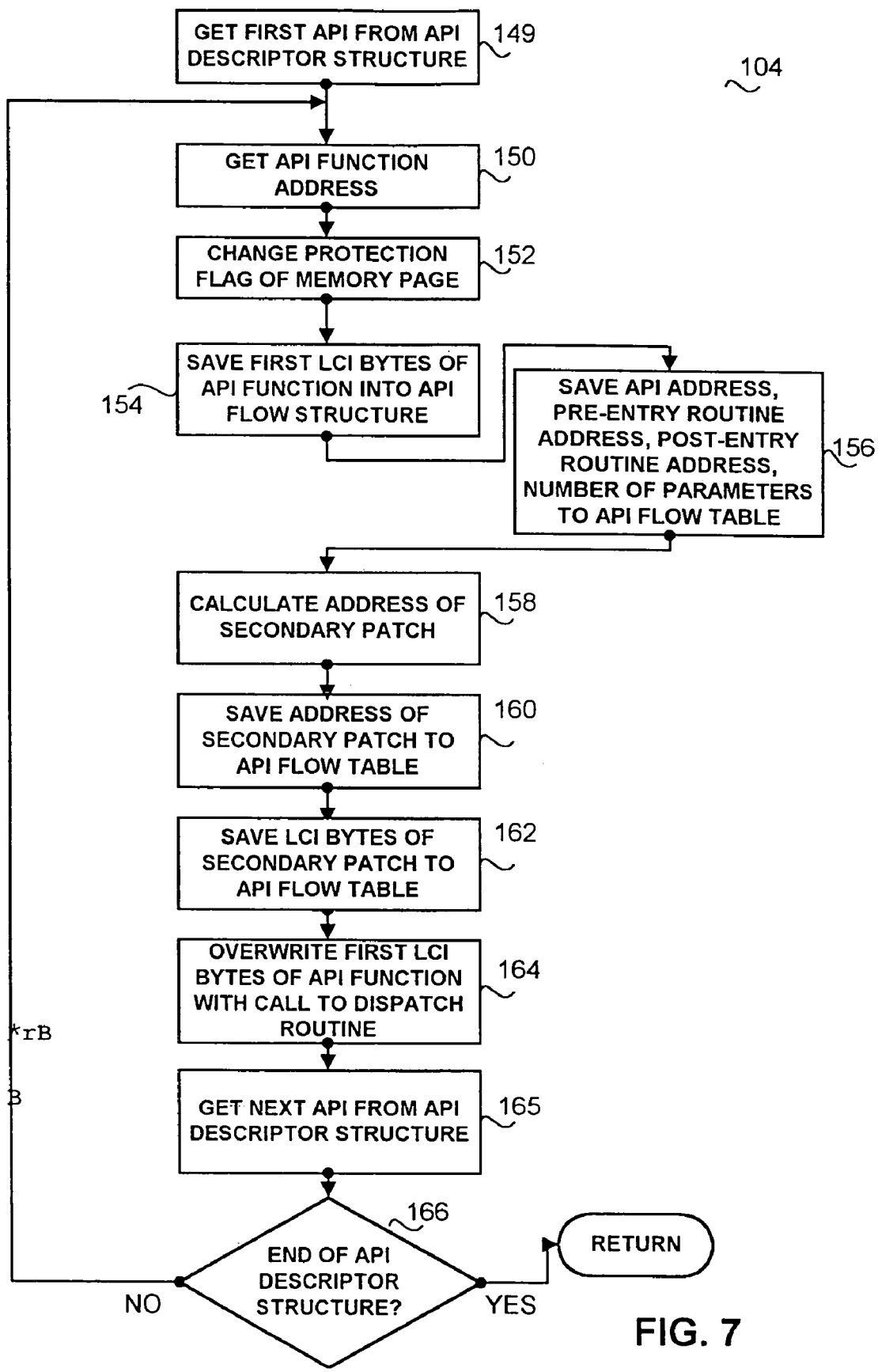
FIG. 7 is a flow diagram of the API Interception Module Hook and Patch API Routine operation referenced in FIG. 5.

A detailed description of Hook and Patch API phase (step 104 in FIG. 5) is illustrated in FIG. 7. First the routine accesses the API Descriptor Structure Table and selects the first API function 30 from the structure (step 149). Subsequently the API function 30 address is accessed (step 150). The protection flag of the memory page that includes the API function 30 is saved to API Flow Structure Table and then changed to "write-enable" the page (step 152). A memory page is a unit of data storage that is brought into real storage from auxiliary storage when a requested item of data is not already in real storage. Changing the memory page protection flag allows the API Interception Module to write code or data into the changed memory page.

To activate a function the Call instruction is used. Like all other executable instructions, the Call instruction represented in object code has a specific length that is expressed in the number of bytes making up the instruction. The number of bytes making up a Call instruction may vary across different processors. Therefore, the Length of the Call Instruction will be referred to as LCI, in order to represent the variable number of bytes.

The first LCI bytes of the API function 30 are saved to API Flow Structure Table (step 154). Additionally, the API function 30 address, Pre-Entry routine address, Post-Entry routine address and the number of the arguments of the API function 30 are loaded into the API Flow Structure Table (step 156).

Calculating the address of the Secondary Patch takes place next (step 158). The address of the Secondary Patch is particularly important as it allows re-patching of the first LCI bytes of the said API to be hooked. Re-patching of the first LCI bytes is desirable in order to allow the API Interception Module 32 to further hook additional or subsequent calls to said API.

In order to calculate the address of the Secondary Patch the API Interception Module 32 uses a known function that returns the length of the next instruction examined (Command Length function). API Interception Module 32 begins examining the instruction located at the first byte of the said API function 30 to be hooked. API Interception Module 32 calls the Command Length function. If the length of the return answer is less than LCI, than the API Interception Module 32 advances the number of bytes returned from said Command Length function, and the operation repeats. If the return address is more than LCI bytes (commutative from the first byte of the API to be hooked) than the return address is the Secondary Patch Address. It will be appreciated that the Secondary Patch Address may include a cumulative number if more than one call has been made to the Command Length function. The desired result is that the first LCI bytes of the API to be hooked 30 are reserved and saved and may be used for hooking purposes. The second desired result is that the Second Patch Address points to the next beginning byte of an instruction within the API to be hooked 30, but not within the first LCI bytes of the said API. Such result is desirable in order for the method operative in accordance with the present invention to execute the said API 30.

The Secondary Patch address is saved to API Flow Structure Table (step 160) as well as first LCI bytes of the API function 30 on the address of the Secondary Patch (step 162). Finally, the first LCI bytes of the API function 30 are overwritten (patched) with a call instruction to API Interception Module 32.

At this point, the API function 30 is patched with the Primary Patch; LCI bytes beginning at first byte of the API function 30 are overwritten with the API Interception Module 32 re-direction code. The rest of the API function 30 executable binary image is untouched but irrelevant at this point. Each call to API function 30 (that is in the calling process address space 18) in this state will be re-directed to the API Interception Module 32 that loaded into address space of the calling process 18.

Finally, the next API function 30 is selected from the API Descriptor Structure Table (step 165) until all API functions 30, 34, 38, and the like that appear in the API Descriptor Structure Table are hooked and patched.

Figure 8:
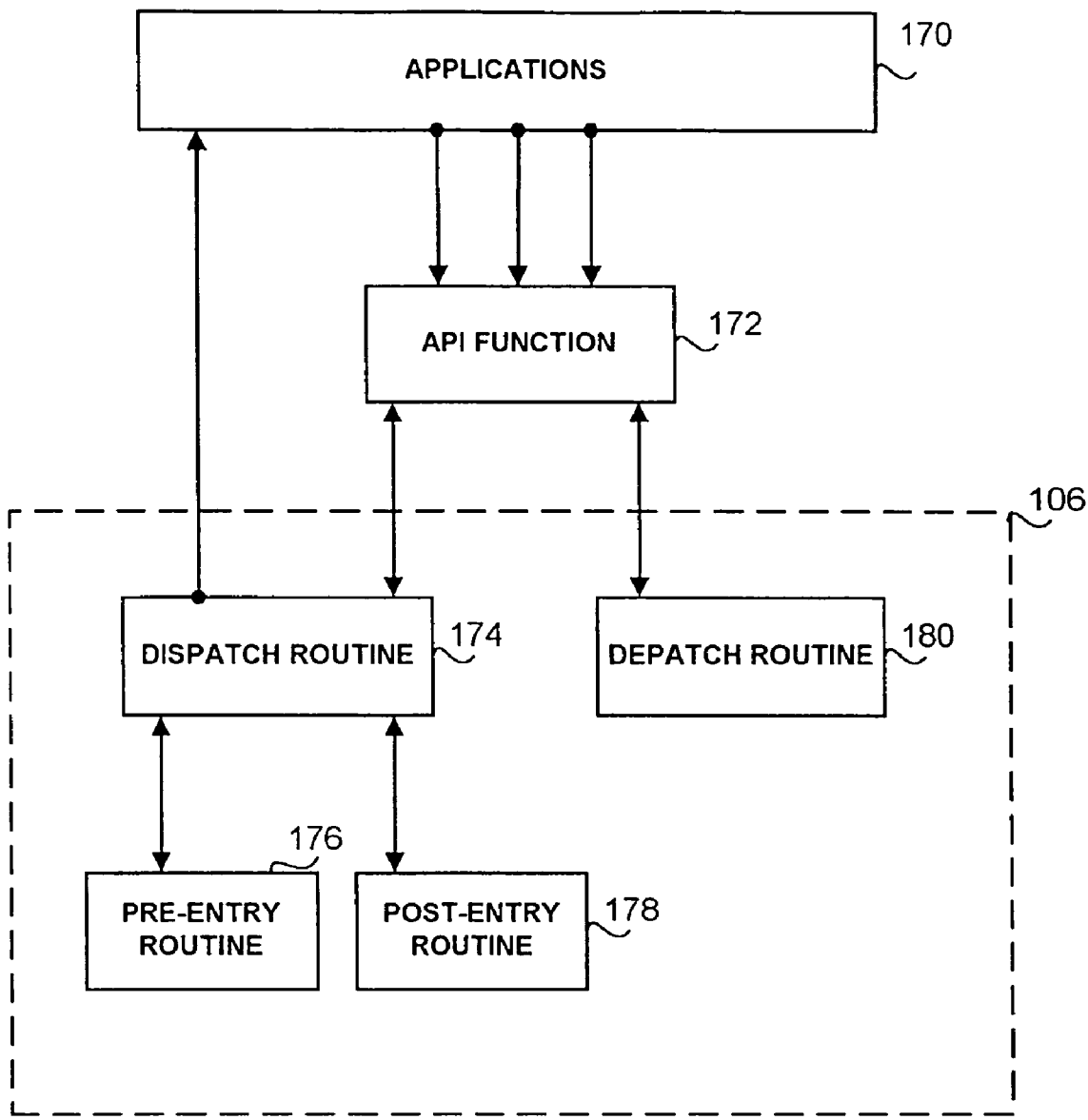
FIG. 8 is a block diagram of the API Interception Module run-time operation referenced in FIG. 1.

FIG. 8 is a generalized block diagram of the API Interception Module calling sequence in association with its various co-routines and in association with the API 30, 34, 38 and the like to be intercepted and the applications that call API 30, 34, 38 and the like.

An application program 170 running in process 18 address space may make an API function 30 call. The API function 30 is Primary Patched (an operation that was further described on the flow diagram of the Hook and Patch API phase 104 of FIG. 7) by the API Interception Module 32, either at system start-up or when the associated process 18 was created. As a result of the Primary Patch previously placed in the first bytes of the API function 30 control is re-directed from the API function 30 by the call instruction on the patched first LCI bytes of its executable binary image.

The API function 30 proceeds with performing the first instruction now placed within the API and calls Dispatch routine 174.

Every time a patched API function 30 calls to Dispatch Routine 174 special entry is created in a specific data structure called Save Return Address list. The entry holds the original return address of the API function 30. The above-described table is necessary in case the API Interception System is terminated without re-booting the operating system or shutting down the computing platform. When API Interception System will go down in an orderly manner, return address on the stack that is in the process address space will be restored, utilizing the Saved Return Address list. The full description of the API Interception System termination process will be described hereunder in association with the following drawings.

Dispatch routine 174, may call Pre-Entry routine 176 to handle API function 30 arguments. When Pre-Entry routine 176 returns control to Dispatch routine 174, the later executes a series of control operations. First Dispatch routine locks out all other threads present within process 18 from calling the API routine 30 being handled. Such lock mechanism may be implemented via declaring the present operation a critical section, recognized in such operating systems such as NT. Within the critical section stage threads or execution flow other than the one currently calling the critical stage would not be serviced by the computer system. Such threads execution is therefore suspended until the critical stage is canceled.

Dispatch routine then re-patches the API routine 30 with a Secondary Patch. Specifically, the Dispatch routine restores the API function 30 original first LCI bytes to its executable binary image and then overwrites the previously calculated Secondary Patch Address (step 158 of FIG. 7) with a call instruction to the Depatch routine 180 of FIG. 5. Finally, it calls the API function 30.

API function 30 patched with the Secondary Patch executes its original instructions up to the Secondary Patch. Then as a result of the overwritten Secondary Patch Address, it calls the Depatch routine 180.

Depatch routine 180 will restore the Secondary Patch, that is, it will overwrite the Secondary Patch Address with the previously saved LCI bytes from the Secondary Patch Address (step 162 of FIG. 7). Depatch routine 180 will also re-create the Primary Patch, that is, it will overwrite the API function 30 executable binary image first LCI bytes with a call instruction to the Dispatch routine 174. Re-writing the call instructions to the API first LCI bytes ensures other calls to the API are hooked as well.

Before returning control to the API function 30, Depatch routine 180 will allow all other threads present in process 18 to call API function 30. This is accomplished by canceling the critical section stage. Finally, it will return control to API function 30, which is now patched with the Primary Patch only.

API function 30 may now run its instructions to their conclusion. After the end of its execution, it will return control to Dispatch routine 174.

As a result of these operations every process that might call API function 30 and the like will either be locked out and wait or will succeed in calling but call only the API function 30 with the Primary Patch. That is, under the API Interception System 10 control, API function 30 and the like will always call Dispatch routine 174. API function 30 and the like execution form may be in three distinct stages:

Stage One) patched with a Primary Patch, when execution begins at the start of the executable binary image, the result of which will be immediate re-direction to Dispatch routine 174;

Stage Two) patched with a Secondary Patch, when execution begins at the start of the executable binary image, the result of which will be normal execution up to the Secondary Patch and then re-direction by its contents to the Depatch routine 180; and Stage Three) patched with a Primary Patch when execution begins at the return address from Depatch routine 180 and as a result API function 30 and the like will execute the whole series of its instructions to their conclusion.

When control returns to Dispatch routine 174 from API routine 30, Dispatch routine 174 will return directly to the calling application 170 and not to the calling API function 30. This is accomplished by Dispatch routine code that directly manipulates the process-level flow control structures (e.g., a Procedure Activation Record or Logical Stack Frame under some host operating systems) before returning to its caller.

Figure 9:
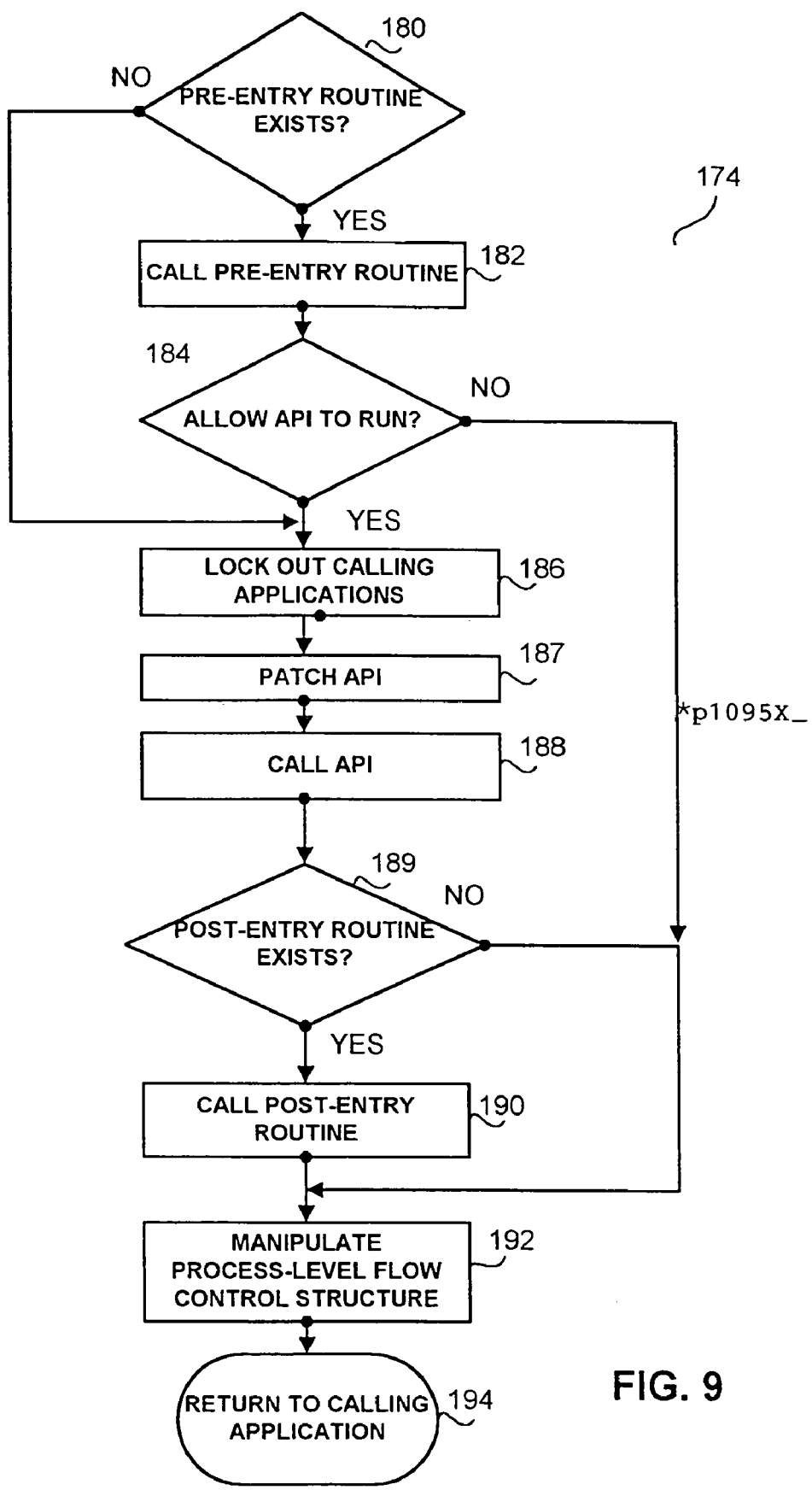
FIG. 9 is a flow diagram of the API Interception Module Dispatch Routine run-time operation referenced in FIG. 8.

A high-level description of the operation of the Dispatch routine 174 in FIG. 8 is illustrated in FIG. 9. First, Dispatch routine 174 checks if there exists a Pre-Entry routine 176 of FIG. 8 for API function 30 that is being handled (step 180). If Pre-Entry routine 176 exists for the API function 30, then the Pre-Entry routine is called (step 182). In association with the Pre-Entry routine 176, return values, API Interception Module 32 and API Interception Control Server 16, as per user predefined or user on line instructions, decide whether to allow the API function 30 to execute (step 184). If the decision is to allow API function 30 to execute, the following steps are taken: A lock is put on the API routine 30 to prevent other threads to call it (step 186). A lock is an operating system mechanism that will keep a certain resource exclusive to a single process. Such lock may be implemented through the use of the critical stage command operative within the NT operating system, as further explained above. Next the API function 30 is re-patched with the Secondary Patch and API function 30 is called (step 188). After the API function 30 returns, Dispatch routine 174 checks if there exists a Post-Entry routine 178 of FIG. 8 for the API function 30 that is being handled (step 189). If Post-Entry routine 178 of FIG. 8 exists it is called (step 190). After control returns from Post-Entry routine 178 to Dispatch Routine 174, Dispatch Routine 174 returns control and return values (if applicable) to calling application 170 of FIG. 8 (step 194) and not to the API function 30 by manipulating a process-level flow control structure (step 192).

Figure 10:
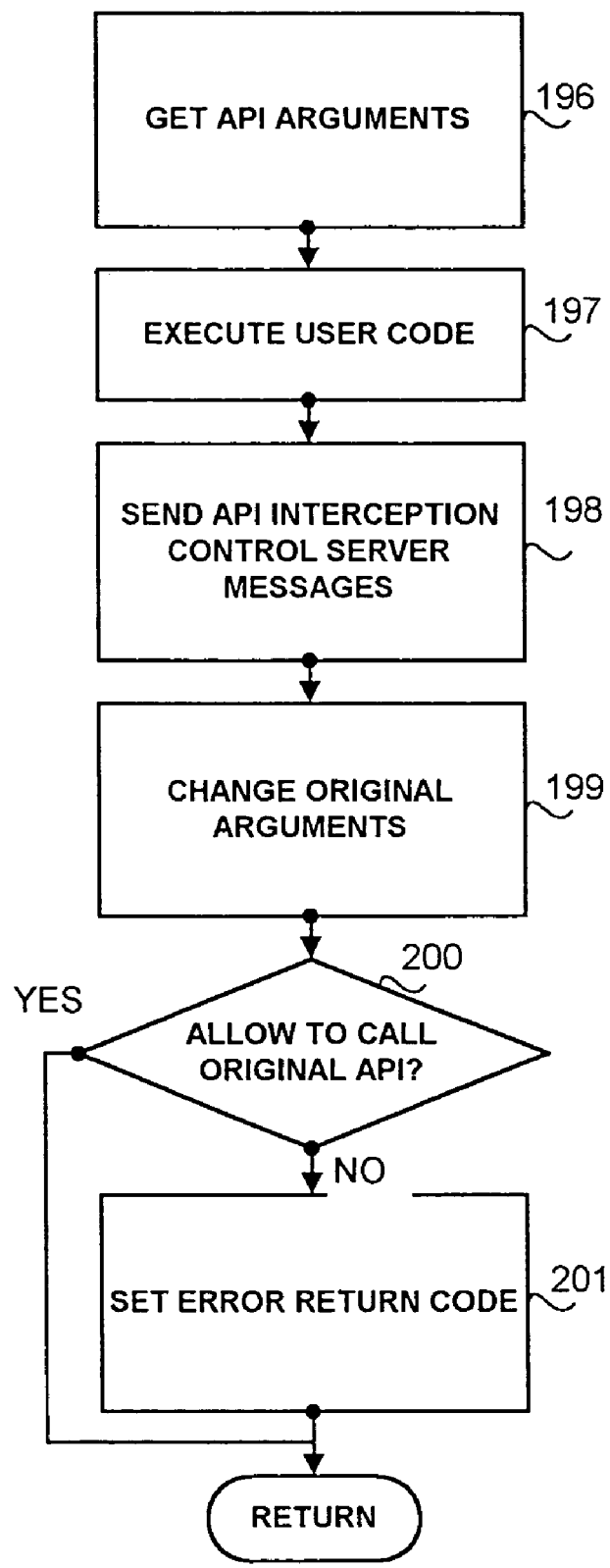
FIG. 10 is a flow diagram of the API Interception Module Pre-Entry Routine operation referenced in FIG. 8.

FIG. 10 illustrates a high-level flow diagram of the Pre-Entry routine 176 of FIG. 8. First, Pre-Entry routine 176 accesses the API function 30 arguments (step 196). Subsequently Pre-Entry routine 176 executes various user-written custom code sections. (step 197) Such user-written custom code may include code required for producing various reports such as statistical reports, system profiles and the like.

Optionally, the API function 30 arguments are processed (step 199) and a decision is made by the Pre-Entry routine whether the API function 30 is allowed to execute in the present environment (step 200). Such decision may rely on user predefined information or on online decision making by a user or a system administrator controlling operation of the operating systems. Such decision could further be made according to static pre-defined parameters or dynamically according to the type and value of the arguments passed by the calling applications. If the decision is not to allow the API function 30 to execute, then a notification associated with prohibition of execution of the API is returned to the Dispatch routine 176 (step 201).

Figure 11:
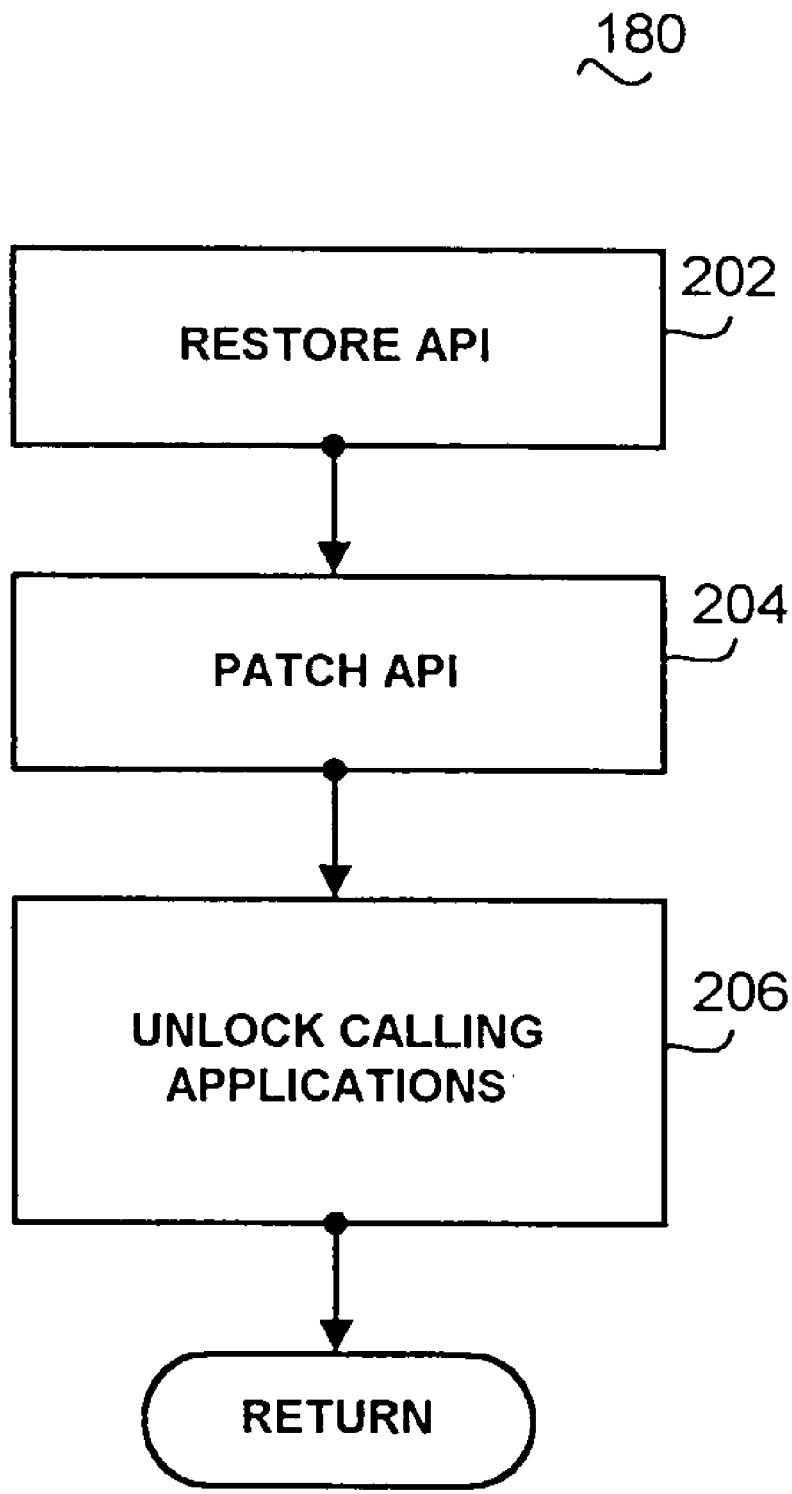
FIG. 11 is a high-level flow diagram of API Interception Module Depatch routine operation referenced in FIG. 8.

FIG. 11 illustrates a high-level flow diagram of the Depatch routine 180 of FIG. 8. First, Depatch routine 180 restores the Secondary Patch saved in step 162 of FIG. 7 to the calling API 30 (step 202). Then Depatch routine 180 will patch the Primary Patch as in step 164 of FIG. 7 (step 204). Before returning control to calling API 30, Depatch routine 180 will release the lock from API 30 (step 206) enabling other processes to call the said API.

Figure 12:
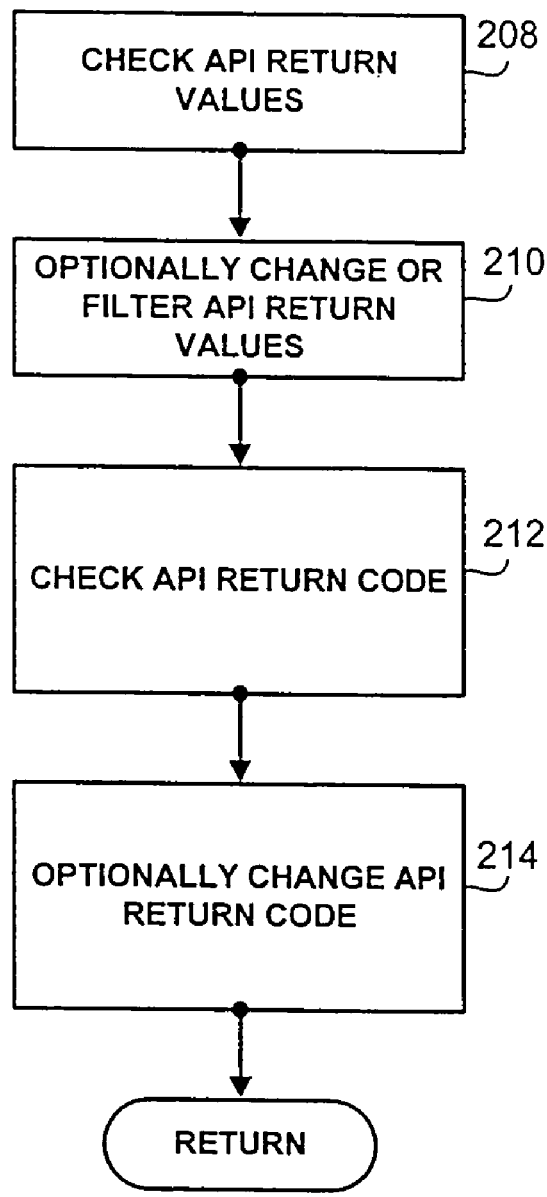
FIG. 12 is a flow diagram of the API Interception Module Post-Entry routine operation referenced in FIG. 8.

FIG. 12 illustrates a high-level flow diagram of the Post-Entry routine 178 of FIG. 8. Post-Entry routine 178 handles the return values of the API 30. First, Post-Entry routine checks the return values (step 208). Optionally Post-Entry routine 178 could process return values, such as changing said values, filtering the values or blocking the values from returning to the calling application 170 of FIG. 8 (step 210). Finally Post-Entry routine 178 checks the API's return code (step 212) and optionally could change it (step 214).

The API Interception System 10 can be shut down in an orderly manner, and the operation will be completely transparent to the users of the system and to the running application programs.

The shutdown is performed in a highly organized manner, which does not necessitate the shutting down the computer platform or the re-booting the operating system from the storage device in order to stop the operations of the API Interception System 10. To close down the API Interception System 10, the system manager will simply instruct the API Interception Control Server 16 of FIG. 1 to perform the requested shutdown. Consequently, API Interception Control Server 16 of FIG. 1 may initiate the following series of steps:

(1) API Interception Control Server 16 of FIG. 1 will send instructions to the appropriate API Interception shutdown routines in each of the API Interception modules 32, 36, 40 of FIG. 1 running in active process address spaces 18, 20, and 22 of FIG. 1 by utilizing the list of Managed Processes.

(2) The API Interception shutdown routines will restore the original return addresses to the prospective stacks from the list of saved return addresses thereby restoring the regular stack frames and addresses.

(3) The API Interception shutdown routines will re-patch the previously patched API functions 30, 34, 38 of FIG. 1 in the process address space 18, 20, and 22 of FIG. 1.

(4) The API Interception shutdown routines with notify the API Interception Control server 16 of FIG. 1 regarding the completion of both operations.

(5) After receiving notifications from the API Interception shutdown routines regarding the conclusion of restore operations the API Interception Control Server 16 of FIG. 1 will allocate memory for the unloader code in each active process address space 18, 20, and 22 of FIG. 1.

(6) The API Interceptor Control Server 16 of FIG. 1 will insert unloader code into each active process address space 18, 20, and 22 of FIG. 1.

(7) The API Interceptor Control Server 16 of FIG. 1 will create remote threads to unload API Interception module DLLs 32, 36, 40 of FIG. 1 from process address space 18, 20, and 22 of FIG. 1.

(8) The threads thus created will utilize specific DLL unload modules such as LdrUnloadDILL function in the ntdll.dll file under Microsoft Windows NT system and unload all the API Interception modules 32, 36, 40 of FIG. 1 running in active process address spaces 18, 20, 22 of FIG. 1.

(9) The API Interception Control Server 16 of FIG. 1 will unload System Call Interception Component 24 of FIG. 1 from kernel space 14 of FIG. 1.

(10) The API Interception Control Server 16 of FIG. 1 will go into a wait state while anticipating instructions from the system manager.

Figure 13:
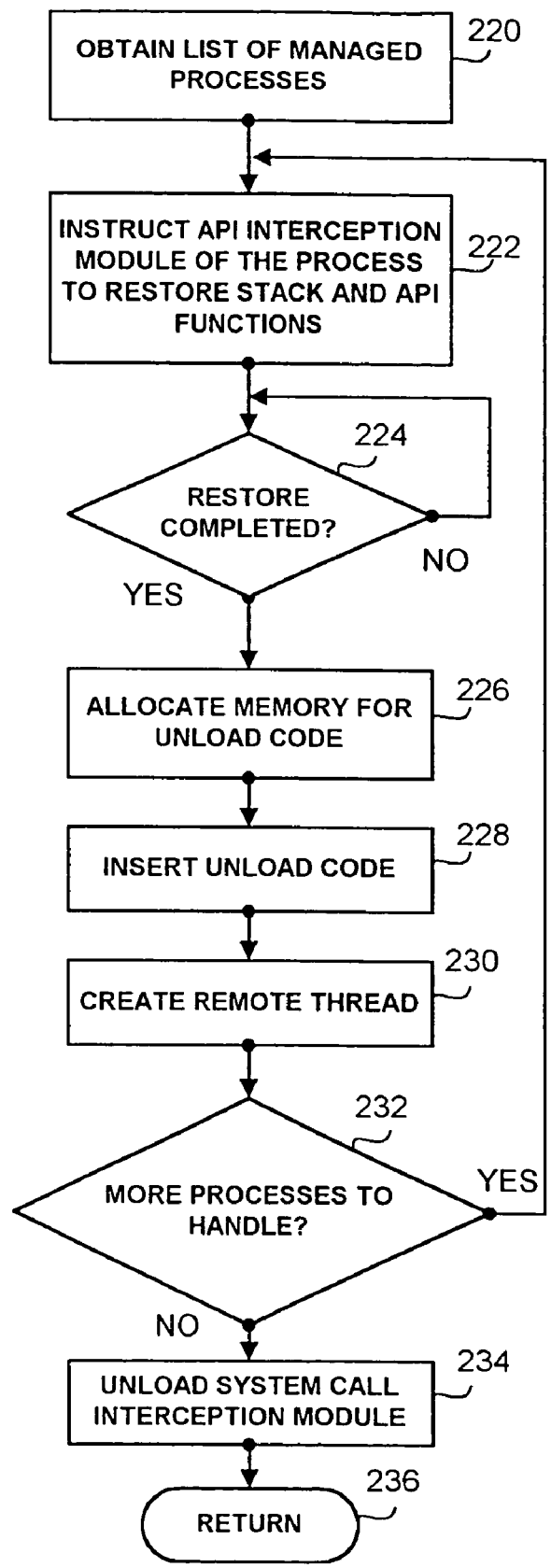
FIG. 13 is a flow diagram of the API Interception Control Server shut down operation.

FIG. 13 illustrates a high-level flow diagram of the operation performed by the API Interception Control Server executing the shut down command. At step 220, the list of Managed Processes is obtained. At step 222 the API Interception module running in the address space of the specific process is instructed to restore the proper structure of the stack and to restore the API functions running in the process address space to the original object code thereof. At step 224, the Server checks whether the restore operations were completed by the API Interception modules. When the restore operations are terminated, at step 226 memory is allocated for the unload code at step 228, the unload code is inserted into the process space, and at step 230 a remote code is created to execute the unload process. At step 232, the server checks whether there are more processes on the Managed Process List. If there are no more processes to handle at step 234 the server unload the system call interception module and returns at step 236.

Additional advantages will readily occur to the person skilled in the art. The invention, in its broader aspects is, therefore, not limited to the specific details, representative methods, systems and examples shown and described. It will be further appreciated by persons skilled in the art that the present invention is not limited to what has been particularly shown and described hereinabove, rather the scope of the applicant's general inventive concept is determined by the claims that follow.

We claim:

1. In a computer system running an operating system platform, a method comprising:
   hooking at least one application program interface (API) routine; and
   replacing hooked API routine code with different code;
   wherein the replacing the hooked API routine code with different code, further comprises:
      storing an API routine address associated with a re-direction of flow of execution;
      wherein enhanced privileges relating to memory space associated with the API routine are enabled;
      wherein the method is adapted for preventing intrusions.

2. The method of claim 1, and further comprising initializing an API controlling routine.

3. The method of claim 2, and wherein the API controlling routine manages operation of the API controlling routine and collecting and storing information corresponding to the API routine.

4. The method of claim 1, wherein the hooking at least one API routine comprises identifying the API routine.

5. The method of claim 4, wherein the hooking at least one API routine further comprises obtaining the API routine address.

6. The method of claim 5, wherein the hooking at least one API routine further comprises determining an address of at least one different code module associated with the re-direction of flow of execution.

7. A computer program product embodied on a computer readable medium, comprising:
   computer code for hooking at least one application program interface (API) routine; and
   computer code for replacing hooked API routine code with different code;
   wherein the replacing the hooked API routine code with different code, further comprises:
      storing an API routine address associated with a re-direction of flow of execution;
      wherein enhanced privileges relating to memory space associated with the API routine are enabled;
      wherein the method is adapted for preventing intrusions.

8. The computer program product of claim 7, and further comprising computer code for initializing an API controlling routine.

9. The computer program product of claim 8, wherein the API controlling routine manages operation of the API controlling routine and collecting and storing information corresponding to the API routine.

10. The computer program product of claim 7, wherein the hooking at least one API routine comprises identifying the API routine.

11. The computer program product of claim 10, wherein the hooking at least one API routine further comprises obtaining the API routine address.

12. The computer program product of claim 11, wherein the hooking at least one API routine further comprises determining an address of at least one different code module associated with the re-direction of flow of execution.

13. A system, comprising:
   logic for hooking at least one application program interface (API) routine; and
   logic for replacing hooked API routine code with different code;
   wherein the replacing the hooked API routine code with different code, further comprises:
      storing an API routine address associated with a re-direction of flow of execution;
      wherein enhanced privileges relating to memory space associated with the API routine are enabled;
      wherein the method is adapted for preventing intrusions.

14. The system of claim 13, and further comprising logic for initializing an API controlling routine.

15. The system of claim 14, wherein the API controlling routine manages operation of the API controlling routine and collecting and storing information corresponding to the API routine.

16. The system of claim 13, wherein the hooking at least one API routine comprises identifying the API routine.

17. The system of claim 16, wherein the hooking at least one API routine further comprises obtaining the API routine address.

18. The system of claim 17, wherein the hooking at least one API routine further comprises determining an address of at least one different code module associated with the re-direction of flow of execution.

* * * * *